United States Patent
Seven et al.

(10) Patent No.: US 12,240,970 B2
(45) Date of Patent: Mar. 4, 2025

(54) POLYMERIC COMPOSITIONS FOR OPTICAL FIBER CABLE COMPONENTS

(71) Applicant: Dow Global Technologies LLC, Midland, MI (US)

(72) Inventors: Karl M. Seven, Auburn, PA (US); Mohamed Esseghir, Lawrenceville, NJ (US); Jeffrey M. Cogen, Flemington, NJ (US)

(73) Assignee: Dow Global Technologies LLC, Midland, MI (US)

( * ) Notice: Subject to any disclaimer, the term of this patent is extended or adjusted under 35 U.S.C. 154(b) by 440 days.

(21) Appl. No.: 17/634,402

(22) PCT Filed: Nov. 3, 2020

(86) PCT No.: PCT/US2020/058634
§ 371 (c)(1),
(2) Date: Feb. 10, 2022

(87) PCT Pub. No.: WO2021/096723
PCT Pub. Date: May 20, 2021

(65) Prior Publication Data
US 2022/0298345 A1  Sep. 22, 2022

Related U.S. Application Data

(60) Provisional application No. 62/933,708, filed on Nov. 11, 2019.

(51) Int. Cl.
*C08L 23/26*  (2006.01)
*B29C 48/00*  (2019.01)
(Continued)

(52) U.S. Cl.
CPC ............ *C08L 23/26* (2013.01); *B29C 48/022* (2019.02); *B29C 48/05* (2019.02); *C08L 23/06* (2013.01);
(Continued)

(58) Field of Classification Search
CPC . G02B 6/443; C08L 2666/24; C08L 2205/08; B29C 48/09
See application file for complete search history.

(56) References Cited

U.S. PATENT DOCUMENTS 3,907,926 A * 9/1975 Brown .................... C08L 67/02
524/258
4,469,851 A * 9/1984 Charles .................. C08L 67/02
524/539

(Continued)

FOREIGN PATENT DOCUMENTS

CN 107915965 4/2018
CN 110079061 8/2019
(Continued)

OTHER PUBLICATIONS

Getting the most from loose fiber optic tubes https://www.lightwaveonline.com/network-design/packet-transport/article/16647145/getting-the-most-from-loose-fiber-optic-buffer-tubes, 2001.*
(Continued)

*Primary Examiner* — Robert S Jones, Jr.
*Assistant Examiner* — Lily K Sloan
(74) *Attorney, Agent, or Firm* — Mark A. Twilley

(57) ABSTRACT

A method includes steps of (a) blending a polymeric composition, including: (i) 5 wt % to 45 wt % of a silanol-functionalized polyolefin based on a total weight of the polymeric composition; (ii) 55 wt % to 90 wt % of a polybutylene terephthalate based on a total weight of the polymeric composition having a melt flow index from 21
(Continued)

g/10 min. to 35 g/10 min. at 250° C. and 2.16 kg; (iii) a condensation catalyst; and (iv) 0.5 wt % to 10 wt % of hydroxy terminated poly(dimethylsiloxane) based on a total weight of the polymeric composition; and (b) extruding the polymeric composition.

8 Claims, 1 Drawing Sheet

(51) Int. Cl.
*B29C 48/05* (2019.01)
*C08L 23/06* (2006.01)
*B29K 23/00* (2006.01)

(52) U.S. Cl.
CPC ... *B29K 2023/065* (2013.01); *C08L 2207/062* (2013.01)

(56) References Cited

U.S. PATENT DOCUMENTS

| | | | |
|---|---|---|---|
| 6,455,637 B1 * | 9/2002 | Jackson | C09J 123/10 |
| | | | 525/197 |
| 7,346,257 B2 | 3/2008 | Mumm et al. | |
| 8,090,232 B2 | 1/2012 | Kachmar | |
| 9,670,345 B2 | 6/2017 | Esseghir et al. | |
| 10,031,303 B1 | 7/2018 | McNutt | |
| 10,502,913 B2 | 12/2019 | Harris et al. | |
| 10,851,258 B2 * | 12/2020 | Li | C08K 5/375 |
| 2002/0151647 A1 * | 10/2002 | Laughner | C08L 23/12 |
| | | | 525/63 |
| 2008/0145009 A1 | 6/2008 | Mumm et al. | |
| 2009/0068429 A1 | 3/2009 | Kmiec et al. | |
| 2010/0159206 A1 * | 6/2010 | Esseghir | B32B 3/08 |
| | | | 156/303.1 |
| 2013/0287353 A1 | 10/2013 | Molin et al. | |
| 2014/0079898 A1 | 3/2014 | Kaushik et al. | |
| 2015/0274856 A1 * | 10/2015 | Berbee | C09D 123/0869 |
| | | | 521/143 |
| 2015/0316736 A1 | 11/2015 | Kachmar | |
| 2015/0370023 A1 | 12/2015 | Baca et al. | |
| 2016/0108239 A1 | 4/2016 | Cree | |
| 2016/0215130 A1 | 7/2016 | Esseghir et al. | |
| 2018/0127555 A1 | 5/2018 | Chaudhary et al. | |

FOREIGN PATENT DOCUMENTS

| | | | | |
|---|---|---|---|---|
| EP | 1115018 | | 7/2001 | |
| EP | 3261096 A1 * | 12/2017 | | C08L 23/06 |
| JP | 2001108160 | | 4/2001 | |
| KR | 20170060081 A1 * | 5/2017 | | B32B 27/32 |
| WO | 2007089644 A2 | | 8/2007 | |
| WO | 2016176034 A1 | | 11/2016 | |
| WO | WO-2017152342 A1 * | 9/2017 | | C08L 23/06 |
| WO | 2019050627 A1 | | 3/2019 | |
| WO | 2019152829 A1 | | 8/2019 | |
| WO | 2021096723 | | 5/2021 | |

OTHER PUBLICATIONS

Amplify TY Brochure (Year: 2013).*
Amplify TY Datasheet (Year: 2010).*
Common HDPE Questions: What Is HDPE? Is HDPE Recyclable? https://www.scrantonproducts.com/common-hdpe-questions/ (Year: 2016).*
The China National Intellectual Property Administration Patent Search Report from corresponding International Application No. 202080077241.X, dated Nov. 3, 2020.

* cited by examiner

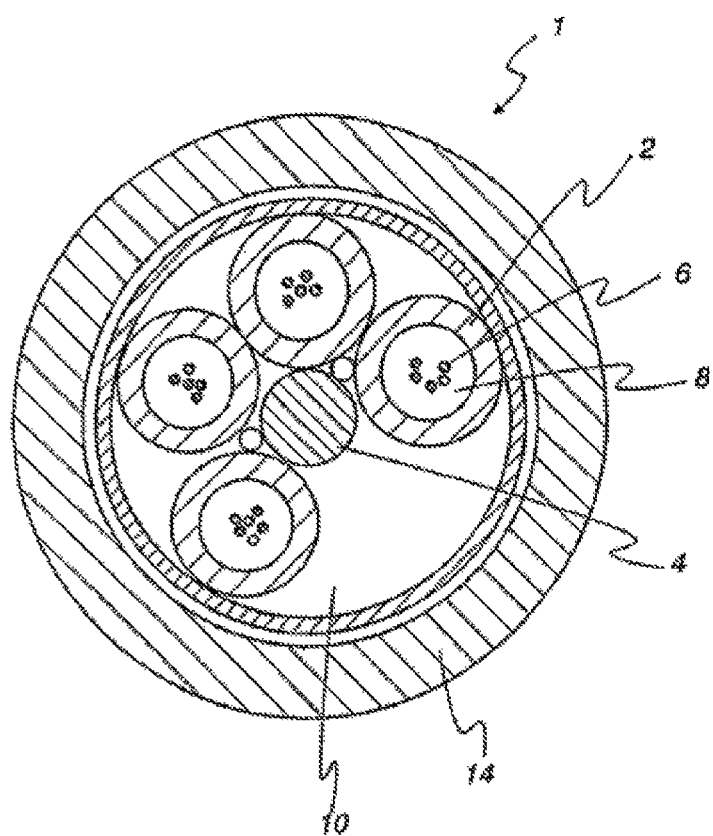

POLYMERIC COMPOSITIONS FOR OPTICAL FIBER CABLE COMPONENTS

BACKGROUND

Field of the Invention

The present disclosure generally relates to polymeric compositions and more specifically to polymeric compositions including polybutylene terephthalate and polyethylene blends for optical fiber cable components.

Introduction

Materials used in optical fiber buffer tubes need to exhibit a balance of rigidity, flexibility, extrudability and kink resistance. Conventional buffer tubes are primarily composed of extruded polybutylene terephthalate ("PBT") which provides rigidity but is prone to kinking during optical fiber installations. Kinking of the buffer tube is disadvantageous as it may result in damage to optical fibers within the buffer tubes.

A conventional approach to increasing buffer tube flexibility involves blending PBT and polyethylene ("PE"). In such a blend, the PBT provides rigidity and telecommunications grease resistance while the PE imparts flexibility and kink resistance. PBT and PE blends incorporate a compatibilizer to facilitate blending due to the polar nature of polyesters and the non-polar nature of polyolefins. One example of a conventional compatibilizer is maleic anhydride grafted polyethylene ("MAH-g-PE"). WO2019050627 discloses the use of PBT and PE blends that employ MAH-g-PE as a compatibilizer.

Recently, attempts have been made at replacing extrusion grade PBT (i.e., PBT having a melt flow index of less than 21 grams per 10 minutes (g/10 min.) at 250° C. and 2.16 kg) with relatively cheaper injection molding grade PBT (i.e., PBT having a melt flow index of 21 g/10 minutes (min.) or greater) in PBT-PE buffer tubes. Use of injection molding grade PBT undesirably decreases the zero-shear viscosity of the PBT-PE blend to less than 1000 Pascal*seconds (PaS) at 250° C., thereby reducing extrudability and dimensional stability of the extruded tube. Further, buffer tubes extruded from injection molding grade PBT-PE blends may exhibit kinking and lower crush resistance due to non-uniformity in wall thickness of the tube brought about by reduced dimensional stability.

Accordingly, it would be surprising to discover a PBT-PE blend that exhibits a zero-shear viscosity greater than 1000 PaS at 250° C. and resists kinking but that utilizes PBT having a melt flow index of greater than 21 g/10 min.

SUMMARY

The present invention offers a solution to providing a PBT-PE blend that contains PBT having a melt flow index of greater than 21 g/10 min. and yet exhibits a zero-shear viscosity greater than 1000 PaS at 250° C. and resists kinking.

The present invention is a result of discovering that blending of a crosslinkable silanol-functionalized polyolefin with hydroxy terminated poly(dimethylsiloxane) and a condensation catalyst within injection molding grade PBT creates a polymeric composition with a zero-shear viscosity sufficient to maintain dimensional stability while being extruded. Unexpectedly, crosslinking of the silanol-functionalized polyolefin occurring only as a result of blending and extrusion is sufficient to increase the zero-shear viscosity of the polymeric composition to maintain dimensional stability of the polymeric composition. Also unexpectedly discovered was that polymeric compositions where the crosslinkable silanol-functionalized polyolefin is a minority constituent are still able to attain zero-shear viscosities high enough to enable good extrudability and dimensional stability of the tube. The inventors also discovered that MAH-g-HDPE is able to maintain morphology stability of the mixed phases as the mixture undergoes high shear events such as mixing, remelting and high-speed extrusion despite the cross-linking of the silanol-functionalized polyolefin. Stability of the mixed phase morphology resists phase segregation which otherwise results in kinking and poor mechanical properties of the buffer tube. As such, relatively lower cost injection molding grade PBT can be used to manufacture stable mixtures that can be used in the manufacture of buffer tubes with good mechanical properties that resist kinking.

The present invention is particularly useful for buffer tubes in optical fiber installations.

According to at least one feature of the present disclosure, a method, comprises the steps:
  (a) blending a polymeric composition, comprising:
    (i) 5 wt % to 45 wt % of a silanol-functionalized polyolefin based on a total weight of the polymeric composition;
    (ii) 55 wt % to 90 wt % of a polybutylene terephthalate based on a total weight of the polymeric composition having a melt flow index from 21 g/10 min. to 35 g/10 min. at 250° C. and 2.16 kg;
    (iii) a condensation catalyst; and
    (iv) 0.5 wt % to 10 wt % of hydroxy terminated poly(dimethylsiloxane) based on a total weight of the polymeric composition; and
  (b) extruding the polymeric composition.

BRIEF DESCRIPTION OF THE DRAWING

Reference is made to the accompanying drawing in which:

FIG. 1 shows a cross-sectional view of a loose buffer tube optical fiber cable.

DETAILED DESCRIPTION

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

All ranges include endpoints unless otherwise stated. Subscript values in polymer formulae refer to mole average number of units per molecule for the designated component of the polymer.

Test methods refer to the most recent test method as of the priority date of this document unless a date is indicated with the test method number as a hyphenated two-digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standards.

As used herein, "unimodal" denotes a polymeric material having a molecular weight distribution ("MWD") such that its gel permeation chromatography ("GPC") curve exhibits only a single peak with no discernible second peak, or even a shoulder or hump, relative to such single peak. In contrast, as used herein, "bimodal" means that the MWD in a GPC curve exhibits the presence of two component polymers, such as by having two peaks or where one component may be indicated by a hump, shoulder, or tail relative to the peak of the other component polymer.

As used herein, the term weight percent ("wt %") designates the percentage by weight a component is of a total weight of the polymeric composition unless otherwise specified.

Polymeric Composition

The polymeric composition of the present invention includes a silanol-functionalized polyolefin, polybutylene terephthalate, a condensation catalyst and hydroxy terminated poly(dimethylsiloxane). As will be explained in greater detail below, the polymeric composition may also include a maleated ethylene-based polymer and a high-density polyethylene. Such polymeric compositions can be extruded to form optical fiber cable protective components such as buffer tubes.

Silanol-Functionalized Polyolefin

The polymeric composition comprises a silanol-functionalized polyolefin. A "silanol-functionalized polyolefin" is a polymer that contains silane and equal to or greater than 50 wt %, or a majority amount, of polymerized α-olefin, based on the total weight of the silanol-functionalized polyolefin. "Polymer" means a macromolecular compound prepared by reacting (i.e., polymerizing) monomers of the same or different type. As noted above, the polymeric composition comprises the silanol-functionalized polyolefin. The silanol-functionalized polyolefin crosslinks and in doing so increases the viscosity of the polymeric composition. The increased viscosity of the polymeric composition enables extrusion of the polymeric composition.

The silanol-functionalized polyolefin may include an α-olefin and silane copolymer, a silane-grafted polyolefin, and/or combinations thereof. An "α-olefin and silane copolymer" is formed from the copolymerization of an α-olefin (such as ethylene) and a hydrolyzable silane monomer (such as a vinyl silane monomer) such that the hydrolyzable silane monomer is incorporated into the backbone of the polymer chain prior to the polymer's incorporation into the polymeric composition. A "silane-grafted polyolefin" or "Si-g-PO" may be formed by the Sioplas process in which a hydrolyzable silane monomer is grafted onto the backbone of a base polyolefin by a process such as extrusion, prior to the polymer's incorporation into the polymeric composition.

In examples where the silanol-functionalized polyolefin is an α-olefin/silane copolymer, the silanol-functionalized polyolefin is prepared by the copolymerization of at least one α-olefin and a hydrolyzable silane monomer. In examples where the silanol-functionalized polyolefin is a silanol grafted polyolefin, the silanol-functionalized polyolefin is prepared by grafting one or more hydrolyzable silane monomers on to the α-olefin backbone.

The silanol-functionalized polyolefin comprises 90 wt % or greater, or 91 wt % or greater, or 92 wt % or greater, or 93 wt % or greater, or 94 wt % or greater, or 95 wt % or greater, or 96 wt % or greater, or 97 wt % or greater, or 97.5 wt % or greater, or 91 wt % or greater, or 99 wt % or greater, while at the same time, 99.5 wt % or less, or 99 wt % or less, or 98 wt % or less, or 97 wt % or less, or 96 wt % or less, or 95 wt % or less, or 94 wt % or less, or 93 wt % or less, or 92 wt % or less, or 91 wt % or less of α-olefin as measured using Fourier-Transform Infrared (FTIR) Spectroscopy. The α-olefin may include $C_2$, or $C_3$ to $C_4$, or $C_6$, or $C_8$, or $C_{10}$, or $C_{12}$, or $C_{16}$, or $C_{18}$, or $C_{20}$ α-olefins, such as ethylene, propylene, 1-butene, 1-hexene, 4-methyl-1-pentene, and 1-octene.

The silanol-functionalized polyolefin may comprise 0.5 wt % or greater, or 0.8 wt %, or 1.0 wt %, or 1.2 wt %, or 1.5 wt % to 1.8 wt %, or 2.0 wt %, or 2.3 wt %, or 2.4 wt %, while at the same time, 2.5 wt % or less, or 2.4 wt % or less, or 2.3 wt % or less, or 2.0 wt % or less, or 1.8 wt % or less, or 1.6 wt % or less, or 1.4 wt % or less, or 1.2 wt % or less, or 1.0 wt % or less, or 0.8 wt %, or 0.6 wt % or less of silane as measured using FTIR Spectroscopy.

The silanol-functionalized polyolefin has a density from 0.910 grams per cubic centimeter (g/cc), or 0.915 g/cc, or 0.920 g/cc, or 0.921 g/cc, or 0.922 g/cc, or 0.925 g/cc to 0.930 g/cc, or 0.935 g/cc, while at the same time, 0.940 g/cc or less, or 0.935 g/cc or less, or 0.930 g/cc or less, or 0.925 g/cc or less, or 0.920 g/cc or less, or 0.915 g/cc or less as measured by ASTM D792.

A "hydrolyzable silane monomer" is a silane-containing monomer that will effectively copolymerize with an α-olefin (e.g., ethylene) to form an α-olefin/silane copolymer (such as an ethylene/silane reactor copolymer), or graft to and crosslink an α-olefin polymer (i.e., a polyolefin) to form a reactor Si-g-polyolefin. The hydrolyzable silane monomer has structure (I):

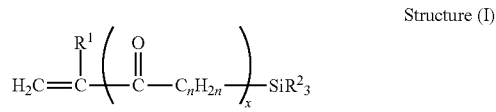

Structure (I)

in which $R^1$ is a hydrogen atom or methyl group; x is 0 or 1; n is an integer from 1 to 4, or 6, or 8, or 10, or 12; and each $R^2$ independently is a hydrolyzable organic group such as an alkoxy group having from 1 to 12 carbon atoms (e.g., methoxy, ethoxy, butoxy), an aryloxy group (e.g., phenoxy), an araloxy group (e.g., benzyloxy), an aliphatic acyloxy group having from 1 to 12 carbon atoms (e.g., formyloxy, acetyloxy, propanoyloxy), an amino or substituted amino group (e.g., alkylamino, arylamino), or a lower-alkyl group having 1 to 6 carbon atoms, with the proviso that not more than one of the three $R^2$ groups is an alkyl. The hydrolyzable silane monomer may be copolymerized with an α-olefin (such as ethylene) in a reactor, such as a high-pressure process to form an α-olefin-silane reactor copolymer. In examples where the α-olefin is ethylene, such a copolymer is referred to herein as an ethylene-silane copolymer. The hydrolyzable silane monomer may also be grafted to a polyolefin (such as a polyethylene) by the use of an organic peroxide, such as 2,5-bis(tert-butylperoxy)-2,5-dimethylhexane, to form a reactor Si-g-PO or an in-situ Si-g-PO.

The hydrolyzable silane monomer may include silane monomers that comprise an ethylenically unsaturated hydrocarbyl group, such as a vinyl, allyl, isopropenyl, butenyl, cyclohexenyl or gamma (meth)acryloxy allyl group, and a hydrolyzable group, such as, for example, a hydrocarbyloxy, hydrocarbonyloxy, or hydrocarbylamino group. Hydrolyzable groups may include methoxy, ethoxy, formyloxy, acetoxy, proprionyloxy, and alkyl or arylamino groups. In a specific example, the hydrolyzable silane monomer is an unsaturated alkoxy silane, which can be grafted onto the polyolefin or copolymerized in-reactor with an α-olefin (such as ethylene). Examples of hydrolyzable silane monomers include vinyltrimethoxysilane (VTMS), vinyltriethoxysilane (VTES), vinyltriacetoxysilane, and gamma-(meth) acryloxy propyl trimethoxy silane Examples of suitable ethylene-silane copolymers are commercially available as SI-LINK™ DFDA-5451 NT and SI-LINK™ AC DFDB-5451 NT, each available from The Dow Chemical Company, Midland, Mich.

Polybutylene Terephthalate

The PBT can have a density in the range of from 1.26 g/cc or greater, or 1.28 g/cc or greater, or 1.30 g/cc or greater, or 1.32 g/cc or greater, or 1.34 g/cc or greater, or 1.36 g/cc or greater, or 1.38 g/cc or greater, or 1.40 g/cc or greater, while at the same time, 1.41 g/cc or less, 1.40 g/cc or less, or 1.38 g/cc or less, or 1.36 g/cc or less, or 1.34 g/cc or less, or 1.32 g/cc or less, or 1.30 g/cc or less, or 1.28 g/cc or less, or 1.26 g/cc or less as measured by ASTM D792.

The PBT can be an extrusion-grade PBT or an injection-molding-grade PBT. Injection-molding-grade PBTs are typically characterized by having lower molecular weight, as evidenced by relatively higher melt indices. The PBT can have a melt index ($I_2$) of 10 g/10 min. or greater, or 15 g/10 min. or greater, or 20 g/10 min. or greater, or 25 g/10 min. or greater, or 30 g/10 min. or greater, or 35 g/10 min. or greater, or 40 g/10 min. or greater, or 45 g/10 min. or greater, or 50 g/10 min. or greater, or 55 g/10 min. or greater, or 60 g/10 min. or greater, or 65 g/10 min. or greater, or 70 g/10 min. or greater, while at the same time, 75 g/10 min. or less, or 70 g/10 min. or less, or 65 g/10 min. or less, or 60 g/10 min. or less, or 55 g/10 min. or less, or 50 g/10 min. or less, or 45 g/10 min. or less, or 40 g/10 min. or less, or 35 g/10 min. or less, or 30 g/10 min. or less, or 25 g/10 min. or less, or 20 g/10 min. or less, or 15 g/10 min. or less as measured according to ASTM method D1238. Melt indices for PBT are determined at 250° C. and 2.16 Kg (i.e., 12).

Examples of suitable commercially available extrusion-grade PBTs include, but are not limited to, PBT-61008 from Suzhou Yingmao Plastics Company, Jiangsu, China; ULTRADUR™ BN6550 from BASF, Ludwigshafen, Germany; CRASTIN™ 6129 NC010 from DuPont, Wilmington, Delaware, USA; and PBT VALOX™ 176 from Sabic Innovative Plastics, Pittsfield, Massachusetts, USA. An example of a suitable commercially available injection-molding-grade PBT includes, but is not limited to, CRASTIN™ 6134 from DuPont, Wilmington, Delaware, USA.

The polymeric composition comprises from 50 wt % to 90 wt % PBT. The polymeric composition may comprise 50 wt % or greater, or 52 wt % or greater, or 54 wt % or greater, or 56 wt % or greater, or 58 wt % or greater, or 60 wt % or greater, or 62 wt % or greater, or 64 wt % or greater, or 66 wt % or greater, or 68 wt % or greater, or 70 wt % or greater, or 72 wt % or greater, or 74 wt % or greater, or 76 wt % or greater, or 78 wt % or greater, or 80 wt % or greater, or 82 wt % or greater, or 84 wt % or greater, or 86 wt % or greater, or 88 wt % or greater, while at the same time, 90 wt % or less, or 88 wt % or less, or 86 wt % or less, or 84 wt % or less, or 82 wt % or less, or 80 wt % or less, or 78 wt % or less, or 76 wt % or less, or 74 wt % or less, or 72 wt % or less, or 70 wt % or less, or 68 wt % or less, or 66 wt % or less, or 64 wt % or less, or 62 wt % or less, or 60 wt % or less, or 58 wt % or less, or 56 wt % or less, or 54 wt % or less, or 52 wt % or less of PBT.

Condensation Catalyst

The polymeric composition comprises a condensation catalyst. The condensation catalyst catalyzes the crosslinking of the silanol-functionalized polyolefin. The condensation catalyst can be any compound that catalyzes a moisture crosslinking reaction with hydrolysable silane groups. Condensation catalysts can include carboxylates of metals, such as tin, zinc, iron, lead, and cobalt; organic bases, inorganic acids, and organic acids. Examples of such catalysts include, but are not limited to, dibutyltin dilaurate ("DBTDL"), dibutyltin diacetate, dioctyltin dilaurate, stannous acetate, stannous caprylate, lead naphthenate, zinc caprylate, cobalt naphthenate, ethyl amines, dibutyl amine, hexylamines, pyridine, inorganic acids, such as sulphuric acid and hydrochloric acid, as well as organic acids, such as sulfonic acids (e.g., toluene sulfonic acid), acetic acid, stearic acid and maleic acid. In various embodiments, the catalyst is selected from a tin-based catalyst and a sulfonic acid. In still other embodiments, the catalyst can be a tin carboxylate. Furthermore, in certain embodiments, the catalyst is DBTDL. The catalyst can be employed neat or as part of a masterbatch. Such a masterbatch may additionally include, for example, a polyolefin carrier (e.g., polyethylene), an antioxidant, and/or a metal deactivator.

The polymeric composition may comprise 0.5 wt % or greater, or 1.0 wt % or greater, or 1.5 wt % or greater, or 2.0 wt % or greater, or 2.5 wt % or greater, or 3.0 wt % or greater, or 3.5 wt % or greater, or 4.0 wt % or greater, or 4.5 wt % or greater, while at the same time, 5.0 wt % or less, or 4.5 wt % or less, or 4.0 wt % or less, or 3.5 wt % or less, or 3.0 wt % or less, or 2.5 wt % or less, or 2.0 wt % or less, or 1.5 wt % or less, or 1.0 wt % or less of condensation catalyst.

The condensation catalyst may be added to the polymeric mixture as part of a catalyst masterbatch blend. Examples of suitable catalyst masterbatches are commercially available under the trade name SI-LINK™ from The Dow Chemical Company, including SI-LINK™ DFDA-5481 Natural and SI-LINK™ AC DFDA-5488 NT. SI-LINK™ AC DFDA-5488 NT is a catalyst masterbatch containing a blend of a thermoplastic polymer, a phenolic compound antioxidant, and a hydrophobic acid catalyst (a silanol condensation catalyst). The polymeric composition may comprise from 0 wt % or greater, or 0.5 wt % or greater, or 1.0 wt % or greater, or 2.0 wt % or greater, or 3.0 wt % or greater, or 4.0 wt % or greater, or 5.0 wt % or greater, or 6.0 wt % or greater, or 7.0 wt % or greater, or 8.0 wt % or greater, or 9.0 wt % or greater, while at the same time, 10.0 wt % or less, or 9.0 wt % or less, or 8.0 wt % or less, or 7.0 wt % or less, or 6.0 wt % or less, or 5.0 wt % or less, or 4.0 wt % or less, or 3.0 wt % or less, or 2.0 wt % or less, or 1.0 wt % or less of catalyst masterbatch based on total weight of the polymeric composition.

Hydroxy-Terminated Poly(dimethylsiloxane)

The polymeric composition comprises hydroxyl-terminated poly(dimethylsiloxane) (PDMS). PDMS comprises units of the formula $R_2SiO$ in which each radical R is methyl. PDMS may have structure (II):

Structure (II)

in which Me is methyl and n is a number sufficient to impart a number average molecular weight (Mn) to the PDMS of greater than or equal to (>) 4,000. The upper value of n may be 100,000 or less, or 10,000 or less, or 1,000 or less, or 500 or less as measured by gel permeation chromatography (GPC). Such polydimethylsiloxanes are commercially available as XIAMETER™ PMX-0156 silanol fluid available from The Dow Chemical Company, Midland, MI, USA.

Maleated Ethylene-Based Polymer

As noted above, the polymeric composition comprises a maleated ethylene-based polymer. As used herein, the term "maleated" indicates a polymer (e.g., an ethylene-based polymer) that has been modified to incorporate a maleic anhydride monomer. Maleated ethylene-based polymer can be formed by copolymerization of maleic anhydride monomer with ethylene and other monomers (if present) to prepare an interpolymer having maleic anhydride incorporated into the polymer backbone. Additionally, or alternatively, the maleic anhydride can be graft-polymerized to the ethylene-based polymer. The above-noted description of ethylene-based polymer is equally applicable to the maleated ethylene-based polymer.

The maleated ethylene-based polymer can have a density of 0.93 g/cc or greater, or 0.933 g/cc or greater, or 0.935 g/cc or greater, or 0.937 g/cc or greater, or 0.94 g/cc or greater, or 0.943 g/cc or greater, or 0.945 g/cc or greater, or 0.947 g/cc or greater, or 0.95 g/cc or greater, or 0.958 g/cc or greater, 0.965 g/cc or greater, while at the same time, 0.97 g/cc or less, or 0.965 g/cc or less, or 0.96 g/cc or less as measured by ASTM D792.

The maleated ethylene-based polymer can have a melt index ($I_2$) ranging from 0.1 to 10 g/10 min., from 0.2 to 8 g/10 min., or from 0.5 to 5 g/10 min at 190° C. and 2.16 Kg.

The maleated ethylene-based polymer can have a maleic anhydride content, based on the total weight of the maleated ethylene-based polymer, of 0.25 wt % or greater, or 0.50 wt % or greater, or 0.75 wt % or greater, or 1.00 wt % or greater, or 1.25 wt % or greater, or 1.50 wt % or greater, or 1.75 wt % or greater, or 2.00 wt % or greater, or 2.25 wt % or greater, or 2.50 wt % or greater, or 2.75 wt % or greater, while at the same time, 3.00 wt % or less, 2.75 wt % or less, or 2.50 wt % or less, or 2.25 wt % or less, or 2.00 wt % or less, or 1.75 wt % or less, or 1.50 wt % or less, or 1.25 wt % or less, or 1.00 wt % or less, or 0.75 wt % or less, or 0.5 wt % or less. Maleic anhydride concentrations are determined by Titration Analysis. Titration Analysis is performed by utilizing dried resin and titrates with 0.02N KOH to determine the amount of maleic anhydride. The dried polymers are titrated by dissolving 0.3 to 0.5 grams of maleated polymer in about 150 mL of refluxing xylene. Upon complete dissolution, deionized water (four drops) is added to the solution and the solution is refluxed for 1 hour. Next, 1% thymol blue (a few drops) is added to the solution and the solution is over titrated with 0.02N KOH in ethanol as indicated by the formation of a purple color. The solution is then back-titrated to a yellow endpoint with 0.05N HCl in isopropanol.

The polymeric composition may comprise from 2.5 wt % to 7.5 wt % maleated ethylene-based polymer. For example, the polymeric composition may comprise 2.5 wt % or greater, or 3.0 wt % or greater, or 3.5 wt % or greater, or 4.0 wt % or greater, or 4.5 wt % or greater, or 5.0 wt % or greater, or 5.5 wt % or greater, or 6.0 wt % or greater, or 6.5 wt % or greater, or 7.0 wt % or greater, while at the same time, 7.5 wt % or less, or 7.0 wt % or less, or 6.5 wt % or less, or 6.0 wt % or less, or 5.5 wt % or less, or 5.0 wt % or less, or 4.5 wt % or less, or 4.0 wt % or less, or 3.5 wt % or less, or 3.0 wt % or less.

Examples of suitable commercially available maleated ethylene-based polymer include, but are not limited to, AMPLIFY™ TY1053H, AMPLIFY™ GR204, and AMPLIFY™ GR205 available from The Dow Chemical Company, Midland, MI, USA; BYNEL™ 4000 series and FUSABOND™ P series products, available from DuPont, Wilmington, DE, USA; OREVAC™ grafted polyethylenes, available from Arkema, Colombes, France; and POLYBOND™ 3000 series, available from Addivant, Danbury, CT, USA.

High-Density Polyethylene

The polymeric composition may comprise high-density polyethylene ("HDPE"). HDPE is an ethylene-based polymer having a density of at least 0.94 g/cc, or from at least 0.94 g/cc to 0.98 g/cc as measured by ASTM D792. HDPE has a melt index from 0.1 g/10 min to 25 g/10 min. HDPE can include ethylene and one or more $C_3$-$C_{20}$ α-olefin comonomers. The comonomer(s) can be linear or branched. Nonlimiting examples of suitable comonomers include propylene, 1-butene, 1 pentene, 4-methyl-1-pentene, 1-hexene, and 1-octene. HDPE can be prepared with either Ziegler-Natta, chromium-based, constrained geometry or metallocene catalysts in slurry reactors, gas phase reactors or solution reactors. The ethylene/$C_3$-$C_{20}$ α-olefin comonomer includes at least 50 wt % ethylene polymerized therein, or at least 70 wt %, or at least 80 wt %, or at least 85 wt %, or at least 90 wt %, or at least 95 wt % ethylene in polymerized form. In an embodiment, the HDPE is an ethylene/α-olefin copolymer with a density from 0.95 g/cc to 0.98 g/cc, and a melt index ($I_2$) from 0.1 g/10 min to 10 g/10 min. In an embodiment, the HDPE has a density from 0.960 g/cc to 0.980 g/cc, and a melt index from 0.1 g/10 min to 10 g/10 min. Nonlimiting examples of suitable HDPE are commercially available ELITE™ 5960 G, HDPE KT 10000 UE™, HDPE KS 10100 UE™, HDPE 35057E™, and AXELERON™ CX-A-6944 NT, each available from The Dow Chemical Company Midland, Michigan, USA The HDPE may be unimodal or bimodal. In other embodiments, the HDPE is bimodal. Exemplary preparation methods for making unimodal HDPE can be found, for example, in U.S. Pat. No. 4,303,771 or 5,324,800. An example of a commercially available unimodal HDPE includes, but is not limited to, DGDL-3364NT™, available from The Dow Chemical Company, Midland, MI, USA.

The polymeric composition can comprise a bimodal HDPE. A bimodal HDPE comprises a first polymeric component and a second polymeric component. The first component can be an ethylene-based polymer; for example, the first component can be a high-molecular-weight ethylene homopolymer or ethylene/alpha-olefin copolymer. The first component may comprise any amount of one or more alpha-olefin copolymers. For example, the first component can comprise less than 10 wt % of one or more alpha-olefin comonomers, based on the total first component weight. The first component may comprise any amount of ethylene; for example, the first component can comprise at least 90 wt % of ethylene, or at least 95 wt % of ethylene, based on the total first component weight. The alpha-olefin comonomers present in the first component of the bimodal HDPE typically have no more than 20 carbon atoms. For example, the alpha-olefin comonomers may have from 3 to 10 carbon atoms, or from 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. In an embodiment, the alpha-olefin comonomers can be selected from the group consisting of propylene, 1-butene, 1-hexene, and 1-octene.

In other embodiments, the alpha-olefin comonomers can be selected from the group consisting of 1-hexene and 1-octene.

The first component of the bimodal HDPE can have a density in the range of from 0.915 g/cc to 0.940 g/cc, from 0.920 g/cc to 0.940 g/cc, or from 0.921 g/cc to 0.936 g/cc. The first component can have a melt index ($I_2$) (190□/2.16 kg), in the range of from 0.5 10 g/10 min. to 10 g/10 min., from 1 10 g/10 min. to 7 g/10 min., or from 1.3 10 g/10 min. to 5 g/10 min. The first component can have a molecular weight in the range of from 150,000 grams per mol (g/mol) to 375,000 g/mol, from 175,000 g/mol to 375,000 g/mol, or from 200,000 g/mol to 375,000 g/mol.

The second polymeric component of the bimodal HDPE can be an ethylene-based polymer. For example, the second component can be a low-molecular-weight ethylene homopolymer. The ethylene homopolymer may contain trace amounts of contaminate comonomers, for example alpha-olefin comonomers. In various embodiments, the second component can comprise less than 1 wt % of one or more alpha-olefin comonomers, based on the weight of the second component. For example, the second component may comprise from 0.0001 to 1.00 wt % of one or more alpha-olefin comonomers, or from 0.001 to 1.00 wt % of one or more alpha-olefin comonomers. The second component can comprise at least 99 wt % of ethylene, or in the range of from 99.5 wt % to 100 wt % of ethylene, based on the weight of the second component.

The second component of the bimodal HDPE can have a density in the range of from 0.965 g/cc to 0.980 g/cc, or from 0.970 g/cc to 0.975 g/cc. The second component can have a melt index ($I_2$) in the range of from 50 g/10 min to 1,500 g/10 min., from 200 g/10 min to 1,500 g/10 min., or from 500 g/10 min to 1,500 g/10 min. The second component can have a molecular weight in the range of 12,000 to 40,000 g/mol, from 15,000 to 40,000 g/mol, or from 20,000 to 40,000 g/mol.

A suitable preparation method for making bimodal HDPE can be found, for example, in U.S. Patent Application Publication No. 2009-0068429, paragraphs [0063] to [0086].

Examples of a commercially available bimodal HDPE include, but are not limited to, DMDA-1250NT™ and DMDC 1250™, both available from The Dow Chemical Company, Midland, MI, USA.

The polymeric composition may comprise 5 wt % or greater, or 6 wt % or greater, or 7 wt % or greater, or 8 wt % or greater, or 9 wt % or greater, or 10 wt % or greater, or 11 wt % or greater, or 12 wt % or greater, or 13 wt % or greater, or 14 wt % or greater, or 15 wt % or greater, or 16 wt % or greater, or 17 wt % or greater, or 18 wt % or greater, or 19 wt % or greater, or 20 wt % or greater, or 21 wt % or greater, or 22 wt % or greater, or 23 wt % or greater, or 24 wt % or greater, while at the same time, 25 wt % or less, or 24 wt % or less, or 23 wt % or less, or 22 wt % or less, or 21 wt % or less, or 20 wt % or less, or 19 wt % or less, or 18 wt % or less, or 17 wt % or less, or 16 wt % or less, 15 wt % or less, or 14 wt % or less, or 13 wt % or less, or 12 wt % or less, or 11 wt % or less, or 10 wt % or less, or 9 wt % or less, or 8 wt % or less, or 7 wt % or less, or 6 wt % or less or less of HDPE.

Additives

The polymeric composition can include one or more particulate fillers, such as glass fibers or various mineral fillers including nano-composites. Fillers, especially those with elongated or platelet-shaped particles providing a higher aspect ratio (length/thickness), may improve modulus and post-extrusion shrinkage characteristics. The filler(s) can have a median size or $d_{50\%}$ of less than 20 µm, less than 10 µm, or less than 5 µm. The fillers may be surface treated to facilitate wetting or dispersion in the polymeric composition. Specific examples of suitable fillers include, but are not limited to, calcium carbonate, silica, quartz, fused quartz, talc, mica, clay, kaolin, wollastonite, feldspar, aluminum hydroxide, carbon black, and graphite. Fillers may be included in the polymeric composition in an amount ranging from 2 wt % to 30 wt %, or from 5 wt % to 30 wt % based on the total weight of the polymeric composition.

The polymeric composition may comprise a nucleating agent. Examples of suitable nucleating agents include ADK NA-11 nucleating agent, available commercially from Asahi Denim Kokai, and HYPERFORM HPN-20E™ nucleating agent, available from Milliken Chemical. The nucleating agents can be included in the polymeric composition in amounts ranging from 0.08 wt % to 0.3 wt %, from 0.09 wt % to 0.25 wt %, or from 0.1 to 0.22 wt % based on the total polymeric composition weight.

The polymeric composition may comprise additional additives in the form of antioxidants, cross-linking co-agents, cure boosters and scorch retardants, processing aids, coupling agents, ultraviolet stabilizers (including UV absorbers), antistatic agents, additional nucleating agents, slip agents, lubricants, viscosity control agents, tackifiers, anti-blocking agents, surfactants, extender oils, acid scavengers, flame retardants and metal deactivators. The polymeric composition may comprise from 0.01 wt % to 10 wt % of one or more of the additional additives.

The UV light stabilizers may comprise hindered amine light stabilizers ("HALS") and UV light absorber ("UVA") additives. Representative UVA additives include benzotriazole types such as TINUVIN 326™ light stabilizer and TINUVIN 328™ light stabilizer commercially available from Ciba, Inc. Blends of HAL's and UVA additives are also effective.

The antioxidants may comprise hindered phenols such as tetrakis[methylene(3,5-di-tert-butyl-4-hydroxyhydro-cinnamate)]methane; bis[(beta-(3,5-ditert-butyl-4-hydroxybenzyl) methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydro-cinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

The processing aids may comprise metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; silicone fluids and polysiloxanes.

Compounding and Extrusion

The components of the polymeric composition except the PBT and condensation catalyst can be added to a batch or continuous mixer for melt blending to form a melt-blended composition. The components can be added in any order or first preparing one or more masterbatches for blending with the other components. The melt blending may be conducted at a temperature above the highest melting polymer but lower than the maximum compounding temperature of 285° C. The melt-blended composition is then delivered to an extruder or an injection-molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Examples of compounding equipment used include internal batch mixers, such as a BANBURY or BOLLING internal mixer. Alternatively, continuous single, or twin screw, mixers can be used, such as FARRELL continuous mixer, a WERNER and PFLEIDERER twin screw mixer, or a BUSS kneading continuous extruder. The type of mixer utilized, and the operating conditions of the mixer, will affect properties of the composition such as viscosity, volume resistivity, and extruded surface smoothness.

The melt blended composition is then mixed with the PBT and the condensation catalyst in an extruder to blend the polymeric composition. With the blended polymeric composition now including the condensation catalyst and the silanol-functionalized polyolefin, the silanol-functionalized polyolefin begins to crosslink and increase the viscosity of the blended polymeric composition. The extrusion of the polymeric composition may begin immediately or may be delayed for 1 minute, or 5 minutes, or 10 minutes, or 30 minutes or 1 hours from the initiation of blending. The polymeric composition is then extruded to form one or more components.

Polymeric Composition Properties

The polymeric composition may exhibit a flexural modulus of 1,000 MPa or greater, or 1,100 MPa or greater, or 1,200 MPa or greater, or 1,300 MPa or greater, or 1,400 MPa or greater, or 1,500 MPa or greater, or 1,600 MPa or greater, or 1,700 MPa or greater, or 1,800 MPa or greater, or 1,900 MPa or greater, or 2,000 MPa or greater, or 2,100 MPa or greater, or 2,200 MPa or greater, or 2,300 MPa or greater, or 2,400 MPa or greater, or 2,500 MPa or greater, or 2,600 MPa or greater, or 2,700 MPa or greater, or 2,800 MPa or greater, or 2,900 MPa or greater, while at the same time, 3,000 MPa or less, or 2,900 MPa or less, or 2,800 MPa or less, or 2,700 MPa or less, or 2,600 MPa or less, or 2,500 MPa or less, or 2,400 MPa or less, or 2,300 MPa or less, or 2,200 MPa or less, or 2,100 MPA or less, or 2,000 MPa or less, or 1,900 MPa or less, or 1,800 MPa or less, or 1,700 MPa or less, or 1,600 MPa or less, or 1,500 MPa or less, or 1,400 MPa or less, or 1,300 MPa or less, or 1,200 MPa or less, or 1,100 MPA or less. The flexural modulus is determined according to the procedure described in the Test Methods section, below.

In various embodiments, particularly in embodiments where the polymeric composition is intended for use in buffer tubes containing a hydrocarbon filling compound, the polymeric composition can exhibit a weight increase of less than 3 wt %, less than 2 wt %, less than 1 wt %, or less than 0.5 wt % when immersed in INFOGEL™ LA 444 filling compound (a fiber-optic-cable buffer-tube filling compound). INFOGEL™ LA 444 filling compound is composed of at least about 70 wt % mineral oil and up to about 10 wt % styrene-butadiene-styrene block copolymer, and is commercially available from Honghui Corp., China.

The polymeric composition may exhibit a melt index ($I_2$) of 4 to 11 g/10 min. at 250° C. and 2.16 Kg. For example, the melt flow index can be 4 g/10 min. or greater, or 4.5/10 min. or greater, or 5 g/10 min. or greater, or 5.5/10 min. or greater, or 6 g/10 min. or greater, or 6.5/10 min. or greater, or 7 g/10 min. or greater, or 7.5/10 min. or greater, or 8 g/10 min. or greater, or 8.5/10 min. or greater, or 9 g/10 min. or greater, or 9.5/10 min. or greater, or 10 g/10 min. or greater, or 10.5/10 min. or greater, while at the same time, 11 g/10 min. or less, or 10.5 g/10 min. or less, or 10 g/10 min. or less, or 9.5 g/10 min. or less, or 9 g/10 min. or less, or 8.5 g/10 min. or less, or 8 g/10 min. or less, or 7.5 g/10 min. or less, or 7 g/10 min. or less, or 6.5 g/10 min. or less, or 6 g/10 min. or less, or 5.5 g/10 min. or less, or 5 g/10 min. or less, or 4.5 g/10 min. or less.

The polymeric composition may exhibit a zero-shear viscosity at 250° C. of 200 PaS or greater, or 500 PaS or greater, or 1,000 PaS or greater, or 5,000 PaS or greater, or 10,000 PaS or greater, or 15,000 PaS or greater, or 20,000 PaS or greater, or 25,000 PaS or greater, while at the same time, 30,000 PaS or less, or 25,000 PaS or less, or 20,000 PaS or less, or 15,000 PaS or less, or 10,000 PaS or less, or 5,000 PaS or less, or 1,000 PaS or less, or 500 PaS or less. The test method for zero-shear viscosity is detailed below.

The polymeric composition may exhibit a break stress of 22 MPa or greater, or 23 MPa or greater, or 24 MPa or greater, or 25 MPa or greater, or 26 MPa or greater, or 27 MPa or greater, or 28 MPa or greater, or 29 MPa or greater, or 30 MPa or greater, or 31 MPa or greater, or 32 MPa or greater, or 33 MPa or greater, or 34 MPa or greater, or 35 MPa or greater, or 36 MPa or greater, or 37 MPa or greater, or 38 MPa or greater, or 39 MPa or greater, while at the same time, 40 MPa or less, or 39 MPa or less, or 38 MPa or less, or 37 MPa or less, or 36 MPA or less, or 35 MPa or less, or 34 MPa or less, or 33 MPa or less, or 32 MPa or less, or 31 MPa or less, or 30 MPa or less, or 29 MPa or less, or 28 MPa or less, or 27 MPa or less, or 26 MPA or less, or 25 MPa or less, or 24 MPa or less. The test method for break stress is detailed below.

The polymeric composition may exhibit a tube crush strength of 55 MPa or greater, or 56 MPa or greater, or 57 MPa or greater, or 58 MPa or greater, or 59 MPa or greater, or 60 MPa or greater, or 61 MPa or greater, or 62 MPa or greater, or 63 MPa or greater, or 64 MPa or greater, or 65 MPa or greater, or 66 MPa or greater, or 67 MPa or greater, or 68 MPa or greater, or 69 MPa or greater, or 70 MPa or greater, or 71 MPa or greater, or 72 MPa or greater, or 73 MPa or greater, or 74 MPa or greater, while at the same time, 75 MPa or less, or 74 MPa or less, or 73 MPa or less, or 72 MPa or less, or 71 MPa or less, or 70 MPa or less, or 69 MPa or less, or 68 MPa or less, or 67 MPa or less, or 66 MPA or less, or 65 MPa or less, or 64 MPa or less, or 63 MPa or less, or 62 MPa or less, or 61 MPa or less, or 60 MPa or less, or 59 MPa or less, or 58 MPa or less, or 57 MPa or less, or 56 MPA or less. The test method for tube crush strength is detailed below.

Optical Fiber Cable

Referring now to FIG. 1, depicted is a cross-sectional view of an exemplary optical fiber cable 1. In the depicted example, the optical fiber cable 1 is a "loose buffer tube" design. In such a cable design, buffer tubes 2 are positioned radially around a central strength member 4, with a helical rotation to the buffer tubes 2 along an axial length of the optical fiber 1. The helical rotation of the buffer tubes 2 allow bending of the cable without significantly stretching the tube or the optical fibers 6. If a reduced number of buffer tubes 2 is required, then foamed filler rods can be used as spacers to occupy one or more buffer tube positions 10 to maintain geometry of the cable 1. A cable jacket 14 is generally fabricated from a polyethylene-based material. The buffer tubes 2 may comprise, consist or consist essentially of the polymeric composition. The buffer tubes 2 are optionally filled with an optic cable grease or gel 8. Gel and grease compounds may include hydrocarbon-based greases incorporating hydrocarbon oils and/or polymer-based greases that use a low viscosity polymer formulated with hydrocarbon oils. These greases and gels provide the suspension and protection needed in the immediate environment surrounding the optical fibers 6, including eliminating air space. The gel and grease also provide a barrier against water penetration, which is detrimental to performance of the optical fibers 6.

EXAMPLES

Materials

The following materials are employed in the Examples, below.

PBT is a PBT having a density of 1.30 g/cc and a melt index of 33.5 g/10 min. at 250° C. (i.e., injection-molding-grade), which is commercially available under the tradename CRASTIN™ 6134 from E.I. du Pont de Nemours, Wilmington, DE, USA.

LDPE is a high-pressure low-density polyethylene having a density of 0.921 g/cc and a melt index of 1.9 g/10 min., that is commercially available under the tradename DXM-446™ from The Dow Chemical Company, Midland, MI, USA.

HDPE is a bimodal HDPE having a density of 0.955 g/cc and a melt index ($I_2$) of 1.5 g/10 min. at 190° C., that is commercially available under the tradename DMDC-1250 NT™ from The Dow Chemical Company, Midland, MI, USA.

MAH-g-HDPE is a maleic-anhydride-grafted HDPE having a density of 0.958 g/cc, a melt index of 2.0 g/10 min., and a maleic anhydride content of greater than 1.0 wt %, which is commercially available under the tradename AMPLIFY TY 1053H™ from The Dow Chemical Company, Midland, MI, USA.

Silane Copolymer is a silane and ethylene copolymer having a density of 0.924 g/cc and a melt index of 1.5 g/10 min. at 190° C. and 2.16 Kg commercially available under the tradename SI-LINK™ DFDB-5451 NT from The Dow Chemical Company, Midland, MI, USA.

M1 is a masterbatch containing less than 5 wt % of Sulphonic acid silanol condensation catalyst based on the total weight of the masterbatch and a phenolic antioxidant in an amount of less than 6 wt % based on the total weight of the masterbatch with the masterbatch having a density of 0.925 g/cc and a melt index of 1.5 g/10 min. at 190° C. and 2.16 Kg. M1 is commercially available under the tradename SI-LINK™ DFDA-5488 NT from The Dow Chemical Company, Midland, MI, USA.

M2 is a masterbatch containing less than 5 wt % of Tin based silanol condensation catalyst based on the total weight of the masterbatch and a phenolic antioxidant in an amount of less than 6 wt % based on the total weight of the masterbatch with the masterbatch having a density of 0.930 g/cc and a melt index of 0.93 g/10 min. at 190° C. and 2.16 Kg. M2 is commercially available under the tradename SI-LINK™ DFDA-5481 NT masterbatch from The Dow Chemical Company, Midland, MI, USA.

Nucleator is a nucleating agent with the chemical name sodium 2,2'-methylene-bis-(4,6-di-tert-butylphenyl)phosphate (CAS No. 85209-91-2), which is commercially available under the tradename NA-11A™ nucleating agent from ADEKA Corporation, Tokyo, Japan.

AO1 is a sterically hindered phenolic antioxidant having the chemical name pentaerythritol tetrakis(3-(3,5-di-tert-butyl-4-hydroxyphenyl)propionate), which is commercially available under the tradename IRGANOX 1010™ from BASF, Ludwigshafen, Germany.

AO2 is a hydrolytically stable phosphite processing stabilizer having the chemical name tris(2,4-ditert-butylphenyl) phosphite, which is commercially available under the tradename IRGAFOS 168™ from BASF, Ludwigshafen, Germany.

OH-PDMS is hydroxy terminated poly(dimethylsiloxane) with a hydroxyl content of 2.5% or less commercially available under the tradename XIAMETER™ PMX-0156 silanol fluid available from The Dow Chemical Company, Midland, MI, USA.

Tube Sample Preparation

Prepare Inventive Examples ("IE") and Comparative Examples ("CE") according to the following criteria. Form a masterblend IE4-15 and CE3-7 including all indicated sample constituents except PBT, M1 and M2. Produce the masterblend using the LDPE, HDPE, silane copolymer, MAH-g-HDPE, OH-PDMS and antioxidant components to ensure proper oil incorporation. Produce the masterblends in a BRABENDER™ mixing bowl setup with cam mixing blades set to 30 rotations per minute and a temperature of 160° C. to 170° C. Place the masterblends of IE4-15 and CE3-7 in a BRABENDER™ model D6/2 twin screw extruder according to the conditions provided in Table 1 using 42 mm screws along with the PBT and M1 and M2.

Place the constituents of IE1-3 and CE2 in a ZSK 30 COPERION™ twin screw extruder set to the compounding conditions provided in Table 2.

TABLE 1

| Parameter | Condition |
|---|---|
| Zone 1 | 230° C. |
| Zone 2 | 240° C. |
| Zone 3 | 250° C. |
| Zone 4 | 253° C. |
| Extruder (rpm) | 60 |

TABLE 2

| Parameter | Condition |
|---|---|
| Barrel 1 | Neutral |
| Barrels 2&3 | 125° C. |
| Barrels 4&5 | 235° C. |
| Barrels 6&7 | 182° C. |
| Barrels 8&9 | 201° C. |
| Barrels 10&11 | 247° C. |
| Die Adaptor | 252° C. |
| Die | 232° C. |
| RPM | 350 |
| Feed rate | 30 lb/hr |
| Discharge melt temperature | 258° C. |

Form samples by performing coated wire extrusion. Coated wire extrusion models both the dimensions of a buffer tube and tests extrusion performance of the polymeric composition. Perform the coated wire extrusion using a BRABENDER Mini-wire line on 14-gauge copper wire. The BRABENDER Mini-wire line settings are provided in Table 3.

TABLE 3

| Parameter | Conditions |
|---|---|
| Zone 1 | 230° C. |
| Zone 2 | 240° C. |
| Zone 3 | 250° C. |
| Zone 4 | 240° C. |
| Melt Temperature | 254° C. |
| RPM | 40 |
| Take off speed | 10 ft/min |

The Inventive and Comparative Examples have a final diameter of approximately 2.9 mm (0.114") and a wall thickness of approximately 0.635 mm (25 mil) on 14 American Wire Gauge solid copper conductor of 1.63 mm (0.064") diameter. Remove the conductor from the wire to leave tubes of the Inventive and Comparative Examples. Perform mechanical testing on the tubes according to the following test methods.

Compression Molded Plaque Samples

Extrude the Inventive and Comparative Examples into single stands having a diameter of 3.6 mm. Feed the strands into a BERLYN™ pelletizer. Compression mold the pellets to form plaques for flex modulus testing.

Test Methods

Employ the following test methods to determine the properties of the materials and the Inventive and Comparative Examples, below.

Density

Determine polymeric densities according to ASTM D792 at 23° C.

Break Stress

Cut the tubes to a length of 10.16 cm. Clamp the tube into an INSTRON™ 4202 tensile testing unit with a jaw separation of 2.54 cm, with a 100 lbs. load cell. Set crosshead speed to 10 mm/minute and measure the stress at the pulling break point of the tubes. Repeat five times and take the average.

Flex Modulus

Die cut rectangular samples of 1.27 cm wide by 7.62 cm by 0.127 cm from compression molded plaques. Place samples in a flex fixture of an INSTRON™ 4202 tester for 3-point deflection using a 5.08 cm span and crosshead speed of 0.127 cm/min. Determine the flex modulus at the maximum flexural stress sustained during the test.

Kinking

Wrap the Inventive and Comparative example samples 1 complete wrap around a 6 mm mandrel and hold in position for 10 seconds. Observe any kinking that forms.

Tube Crush

Place tube in an INSTRON™ 4202 tester between an upper moveable plate (dimensions 50 mm×100 mm) attached to a crosshead and a lower stationary plate (dimensions 50 mm×100 mm). Align the tube to the longer dimension of the plate and move the top plate to just touch the top of the tube. Set crosshead speed to 0.127 cm/min and record the compressive force at the yield point of the tube.

Zero Shear Viscosity

Apply 500 Pa of stress at 250° C. for 3 minutes using a RHEOMETRICS™ SR-200 controlled stress rheometer equipped with 25 mm parallel plates. Calculate zero shear viscosity over a range in the data in which the time rate of change of the measured strain is constant. Allow for 15-minute recovery times.

Test Results

Table 4 provides composition and mechanical property data for CE1-CE7.

TABLE 4

|  | CE1 | CE2 | CE3 | CE4 | CE5 | CE6 | CE7 |
|---|---|---|---|---|---|---|---|
| PBT | 100 | 70.85 | 70.8 | 70.8 | 70.8 | 60 | 40 |
| HDPE | 0 | 12.97 | 13 | 16 | 9.8 | 17.2 | 27.2 |
| LDPE | 0 | 12.97 | 0 | 0 | 0 | 0 | 0 |
| Silane Copolymer | 0 | 0 | 13 | 10 | 16 | 17.2 | 27.2 |
| MAH-g-HDPE | 0 | 2.36 | 0 | 0 | 0 | 2.36 | 2.36 |
| Nucleator | 0 | 0.21 | 0 | 0 | 0 | −0 | −0 |
| AO1 | 0 | 0.43 | 0.2 | 0.2 | 0.2 | 0.2 | 0.2 |
| AO2 | 0 | 0.21 | 0 | 0 | 0 | 0 | 0 |
| OH-PDMS | 0 | 0 | 1 | 1 | 1.2 | 1 | 1 |
| M1 | 0 | 0 | 2 | 2 | 2 | 2 | 2 |
| M2 | 0 | 0 | 0 | 0 | 0 | −0 | 0− |
| Total | 100 | 100 | 100 | 100 | 100 | 100 | 100 |
| Tube Break Stress (MPa) | 53.39 | 21.32 | 26.4 | 24.15 | 24.41 | 17.4 | 9.9 |
| Flex Modulus (MPa) | 2754 | 2246 | 1390 | 1214 | 1324 | 1695.4 | 1095.6 |
| Zero-Shear Viscosity (PaS) | 78 | 3216 | 4072 | 722 | 991 | 6899 | 44100 |
| Tube Crush (MPa) | 64.9 | 64.94 | 66.6 | 62.4 | 61.4 | 76.8 | 49.5 |
| Kinking | Sever Kinking | Kinks | Broke | Broke | Broke | Kinks/Brittle | Kinks/Brittle |

Table 5 provides composition and mechanical property data for IE1-IE15.

TABLE 5

| | IE1 | IE2 | IE3 | IE4 | IE5 | IE6 | IE7 | IE8 |
|---|---|---|---|---|---|---|---|---|
| PBT | 65.16 | 73.29 | 69.23 | 69.44 | 69.44 | 69.44 | 69.44 | 70.24 |
| HDPE | 12.71 | 0 | 0 | 12.5 | 12.5 | 16 | 8.8 | 6 |
| LDPE | 0 | 0 | 0 | 0 | 0 | 0 | 0 | 0 |
| Silane Copolymer | 12.71 | 14.7 | 18.77 | 12.5 | 12.5 | 9 | 16 | 18 |
| MAH-g-HDPE | 2.31 | 4.9 | 4.9 | 2.36 | 2.36 | 2.36 | 2.36 | 2.36 |
| Nucleator | 0.21 | 0.21 | 0.21 | 0 | 0 | 0 | 0 | 0 |
| AO1 | 0 | 0 | 0 | 0.2 | 0.2 | 0.2 | 0.2 | 0.2 |
| AO2 | 0 | 0 | 0 | 0 | 0 | 0 | 0 | 0 |
| OH-PDMS | 4.9 | 4.9 | 4.9 | 1 | 1 | 1 | 1.2 | 1.2 |
| M1 | 2 | 2 | 2 | 2 | | 2 | 2 | 2 |
| M2 | 0 | 0 | 0 | 0 | 2 | 0 | 0 | 0 |
| Total | 100 | 100 | 100 | 100 | 100 | 100 | 100 | 100 |
| Break Stress (MPa) | 28.34 | 28.92 | 29.83 | 31.2 | 31.35 | 33.99 | 31.94 | 30.07 |
| Flex Modulus (MPa) | 1551 | 1759 | 1636 | 1769 | 2038 | 1858 | 1630 | 1683 |
| Zero-Shear Viscosity (PaS) | N/A | N/A | N/A | 1967 | 16490 | 3508 | 3785 | 6972 |
| Tube Crush (MPa) | 68.9 | 66.7 | 72.9 | 62.5 | 61 | 67.9 | 57.7 | 63.2 |
| Kinking | none | none | none | none | none | none | none | none |

| | IE9 | IE10 | IE11 | IE12 | IE13 | IE14 | IE15 |
|---|---|---|---|---|---|---|---|
| PBT | 71.74 | 72.1 | 80 | 60 | 60 | 74.2 | 69.44 |
| HDPE | 0 | 0 | 7.2 | 17.2 | 16 | 0 | 16 |
| LDPE | 0 | 0 | 0 | 0 | 0 | 0 | 0 |
| Silane Copolymer | 22 | 24 | 7.2 | 17.2 | 15.9 | 17.7 | 9 |
| MAH-g-HDPE | 2.36 | 0 | 2.36 | 2.36 | 4.9 | 4.9 | 2.36 |
| Nucleator | 0 | 0 | 0 | 0 | 0 | 0 | 0 |
| AO1 | 0.2 | 0.2 | 0.2 | 0.2 | 0.2 | 0.2 | 0.2 |
| AO2 | 0 | 0 | 0 | 0 | 0 | 0 | 0 |
| OH-PDMS | 1.7 | 1.7 | 1 | 1 | 1 | 1 | 1 |
| M1 | 2 | 2 | 0 | 0 | 0 | 0 | |
| M2 | 0 | 0 | 0 | 2 | 2 | 2 | 2 |
| Total | 100 | 100 | 100 | 100 | 100 | 100 | 100 |
| Break Stress (MPa) | 29.31 | 25.28 | 37.2 | 27.4 | 27.4 | 31.8 | 31.1 |
| Flex Modulus (MPa) | 1673 | 1307 | 1888.8 | 1589 | 1566.9 | 1923.7 | 1954.7 |
| Zero-Shear Viscosity (PaS) | 1079 | 18990 | 1718 | 8844 | 16580 | 572 | 5092 |
| Tube Crush (MPa) | 62.1 | 65.2 | 57.4 | 65 | 64.9 | 66.8 | 64.1 |
| Kinking | none | none | none | none | none | none | none |

As can be seen from Table 4, CE1-CE7 each exhibit kinking or breaking. The kinking and breaking are believed to be a result of dimensional and morphology instability during extrusion. Further, the dimensional and morphology instability generally led to lower break stress values in the Comparative Examples CE2-CE7 (examples comprising polyolefin) as compared to IE1-IE15. Accordingly, IE1-IE15 demonstrate improved kink resistance compared to the pure PBT (CE1) and sample without the silanol-functionalized polyolefin component (CE2).

IE1 replaces about an equivalent amount of LDPE used in CE2 with Silane Copolymer while keeping the same amount of MAH-g-HDPE. IE1 shows improved kink resistance and higher tube break stress compared to CE2. The HDPE component was removed in IE2 and the amount of MAH-g-HDPE roughly doubled versus IE1. IE2 shows similar improved tube break stress and higher flex modulus compared to IE1 and no kinking. It is believed that the increased concentration of MAH-g-HDPE increased morphology stability resulting tin the improved flex modulus. IE3 is similar to IE2 except the level of Silane Copolymer was increased by about 4 wt %. The results of IE3 did not change significantly compared to IE2. IE4 is similar in composition to IE1 except IE4 has 1 wt % of OH-PDMS instead of 4.9 wt %. IE4 had only a slightly higher tube break stress and flex modulus versus IE1, IE2, and IE3. This result suggests that 1 wt % OH-PDMS is sufficient to enable crosslinking of the Silane Copolymer IE samples. CE3 is similar in composition to IE4 except it does not include MAH-g-HDPE. CE3 failed the kink test and also had lower break stress and flex modulus values compared to IE1-IE4. This result is believed to occur due to morphology instability from the lack of the compatibilizing effect of MAH-g-HDPE between the PBT and the HDPE. IE9 has no HDPE and a greater wt % of Silane Copolymer as compared to IE6, IE7, and IE8. The level of OH-PDMS is also increased as compared to IE8 to accommodate the higher level of the Silane Copolymer. Results for IE9 indicate acceptable mechanical properties can be achieved without the HDPE component compared to IE6, IE7, and IE8. IE10 is similar in composition to IE9 except that no MAH-g-HDPE and HDPE are included. The amount of Silane Copolymer is increased to 24 wt % in IE10. IE10 shows a significant drop in tube break stress and flex modulus compared to IE5-IE9 however the zero-shear viscosity increased and exhibited no kinking indicating that the Silane Copolymer at sufficiently high levels is able to maintain morphology stability and provide sufficient viscosity to maintain dimensional stability during extrusion.

The results demonstrate the ability to produce compositions that may be melt mixed and immediately used for extrusion while providing acceptable mechanical properties. Further, the compositions can use lower cost and lower viscosity injection molding grade PBT material while maintaining dimensional stability.

What is claimed is:

1. A method, comprising the steps:
blending a polymeric composition, comprising:
(a) 5 wt % to 45 wt % of a silanol-functionalized polyolefin based on a total weight of the polymeric composition, wherein the silanol-functionalized polyolefin is an ethylene-silane copolymer comprising silane monomer incorporated into a polymer backbone of the ethylene-silane copolymer;
(b) 55 wt % to 90 wt % of a polybutylene terephthalate based on a total weight of the polymeric composition having a melt flow index from 21 g/10 min. to 35 g/10 min. at 250° C. and 2.16 kg;
(c) a condensation catalyst;
(d) 0.5 wt % to 10 wt % of hydroxy terminated poly(dimethylsiloxane) based on a total weight of the polymeric composition;
(e) 0.1 wt % to 10 wt % maleated ethylene-based polymer based on a total weight of the polymeric composition; and
(f) 5 wt % to 25 wt % of a high-density polyethylene in the polymeric composition based on a total weight of the polymeric composition and wherein the high-density polyethylene has a density of from 0.94 g/cc to 0.98 g/cc as measured according to ASTM D792; and
extruding the polymeric composition.

2. The method of claim 1, wherein the silanol-functionalized polyolefin comprises from 0.5 wt % to 2.5 wt % of silane based on the weight of the silanol-functionalized polyolefin.

3. The method of claim 2, wherein the silanol-functionalized polyolefin has a density ranging from 0.91 g/cc to 0.94 g/cc as measured according to ASTM D792.

4. The method of claim 1, wherein the polymeric composition comprises from 2 wt % to 5 wt % of the maleated ethylene-based polymer based on a total weight of the polymeric composition.

5. The method of claim 4, wherein the maleated ethylene-based polymer has a density of 0.958 g/cc as measured according to ASTM D792.

6. The method of claim 1, wherein the polymeric composition comprises from 5 wt % to 25 wt % silanol-functionalized polyolefin, from 60 wt % to 80 wt % polybutylene terephthalate, from 1 wt % to 6 wt % of a maleated ethylene-based polymer and from 0.5 wt % to 5 wt % hydroxy terminated poly(dimethylsiloxane).

7. A method, comprising the steps:
blending a polymeric composition, comprising:
(a) 5 wt % to 45 wt % of a silanol-functionalized polyolefin based on a total weight of the polymeric composition wherein the silanol-functionalized polyolefin is an ethylene-silane copolymer comprising silane monomer incorporated into a polymer backbone of the ethylene-silane copolymer;
(b) 55 wt % to 90 wt % of a polybutylene terephthalate based on a total weight of the polymeric composition having a melt flow index from 21 g/10 min. to 35 g/10 min. at 250° C. and 2.16 kg;
(c) a condensation catalyst; and
(d) 0.5 wt % to 10 wt % of hydroxy terminated poly(dimethylsiloxane) based on a total weight of the polymeric composition; and
extruding the polymeric composition.

8. The method of claim 1, wherein extruding the polymeric composition further comprises extruding the polymeric composition as an optical fiber buffer tube.

* * * * *